May 11, 1926.  1,584,645
F. H. PROSSER
SELF DUMPING VEHICLE BODY
Filed Nov. 3, 1923   2 Sheets-Sheet 1

F. H. Prosser, INVENTOR
BY Victor J. Evans ATTORNEY

WITNESS:

May 11, 1926.

F. H. PROSSER 1,584,645

SELF DUMPING VEHICLE BODY

Filed Nov. 3, 1923   2 Sheets-Sheet 2

F. H. Prosser
INVENTOR

BY Victor J. Evans
ATTORNEY

WITNESS:

Patented May 11, 1926.

1,584,645

UNITED STATES PATENT OFFICE.

FRANK H. PROSSER, OF STREATOR, ILLINOIS.

SELF-DUMPING VEHICLE BODY.

Application filed November 3, 1923. Serial No. 672,583.

The general object of my said invention is the provision of a self-dumping vehicle body—i. e., a body adapted when released to dump of itself; the said body being characterized by simplicity and strength in construction and by the facility with which it may be released for dumping as well as by the facility with which it may be restored to its normal carrying position.

Another object of the invention is the provision of peculiar and advantageous means whereby the movement of the body to dumping position will be attended by the opening of the tail gate thereof.

Another object is the provision of a peculiar and advantageous tail gate a part of which is adapted to be opened by hand when it is desired to remove a portion of the contents of the body without dumping thereof.

To the attainment of the foregoing, the invention consists in the improvement as hereinafter described and definitely claimed.

In the accompanying drawings, forming part of this specification:—

Similar numerals designate corresponding parts in all of the views of the drawings.

The automobile chassis 1 is supported by wheels 2 and 3 and is otherwise of the ordinary construction or of any other construction compatible with the purpose of my invention.

Figure 3:
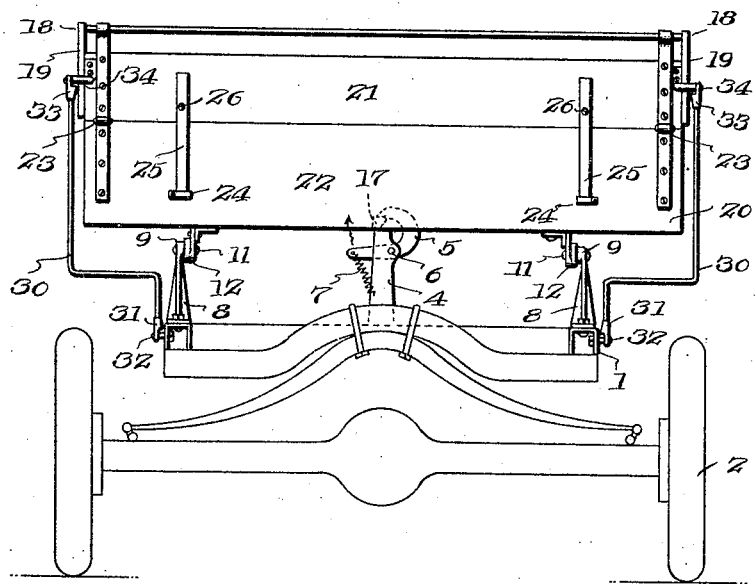
Figure 3 is a rear elevation of the vehicle embodying my improvements.

In accordance with my invention a pedestal 4 is located on the chassis or frame 1 at an intermediate point in the length of the chassis or frame and is equipped with a latch 5, preferably of the curvilinear form shown in Figure 3, and pivoted at 6 and subject to the action of a retractile spring 7, the said spring being connected at its upper end to the lower straight arm of the latch 5 and at its lower end to the pedestal 4.

Figure 4:
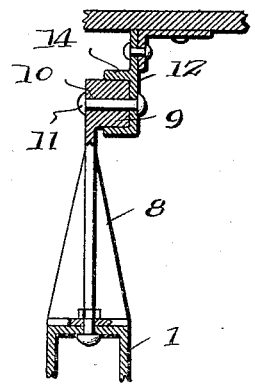
Figure 4 is an enlarged vertical cross-section, taken in the plane indicated by the line 4—4 of Figure 1 and showing one of the fulcrum or pivoted connections of the body.

Located on the chassis or frame 1 adjacent to the rear end and opposite sides thereof are standards 8 which are fixed to the chassis or frame 1 and are preferably of the web type illustrated with lateral enlargements 9 adjacent to their upper ends, said enlargements 9 being transversely apertured at 10 to receive headed pintles 11 through the medium of which lugs 12 on the body 13 are pivotally connected to the standards 8. By particular reference to Figure 4, it will be noted that the lugs 12 are provided with circular cap portions 14 which surround the enlargements 9 of circular form, whereby the lugs 12 are supported by the enlargements 9 and are free to turn about the said enlargements 9 with the result that practically all weight is taken off the pintles 11 and the strength and durability of the body connection is materially increased.

Figure 1:
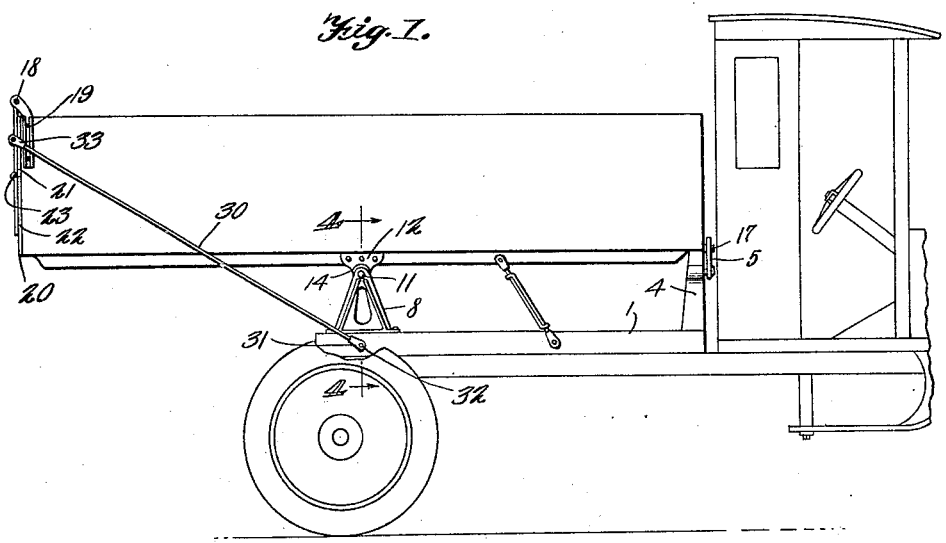
Figure 1 is a side elevation of a motor vehicle equipped with the body and body appurtenances constituting the preferred embodiment of my invention.
Figure 2:
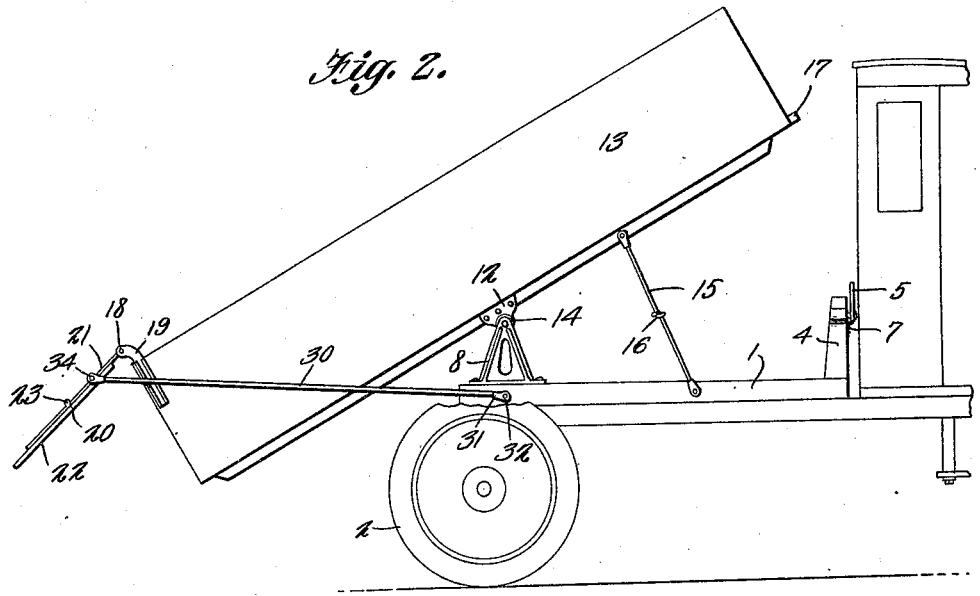
Figure 2 is a similar view but showing the body in dumping position.

Interposed between the lower forward portion of the body 13 and the chassis or frame 1 are limiting links 15, Figures 1 and 2, each link being pivotally connected at its outer end and having at its inner end an eye 16 which receives the other link. The said eyes 16 are designed to abut against each other when the body 13 is in dumping position and hence it will be apparent that the links 15 which are employed at opposite sides of the body 13 will operate to stop the gravitation of the rear portion of the body 13 in the dumping position shown in Figure 2.

At its forward end the body 13 is provided with a lug 17 which is designed to be engaged by the latch 5 as shown by dotted lines in Figure 3 so as to enable the said latch 5 to hold the body 13 against dumping. When, however, the latch 5 is manually swung in the direction indicated by arrow in Figure 3 it will be manifest that the lug 17 will be released so that the body will be free to swing from the position shown in Figure 1 to that shown in Figure 2. Manifestly when the body 13 is loaded the comparatively heavy rear arm or portion of the body 13 will cause the body by gravitational action to assume the position shown in Figure 2. The lug 17 is rounded at one side as shown in Figure 3 to enable the said lug to ride past the latch 5 and snap into engagement with said latch 5 when the body is manually restored to the position shown in Figure 1.

Hingedly connected at 18 to arms 19 on the rear portion of the body 13 which is open at its rear end is a tail gate 20. It is within the purview of my invention to construct the tail gate 20 in any manner compatible with the purpose thereof. I prefer, however, to have the tail gate comprise an upper section 21, a lower section 22, hinged at 23 to the upper section 21, and means for detachably holding the sections 21 and 22 in fixed alinement so that they will swing as a unit. In the present and preferred embodiment of my invention the means alluded to include L-shaped keepers 24 on the lower section 22 and edgewise movable latch levers 25, hinged at 26 to the upper section 21 and swingable edgewise into and out of engagement with the said keepers 24. As appears in Figure 2 when the latch levers 25 are disengaged from the keepers 24 and are swung to positions above the section 22, the section 22 can be swung outwardly. Thus when the body 13 is in horizontal position, the section 22 can be readily opened for the removal of a portion of the contents of the body 13 through the medium of a usual scoop or the like.

Figure 5:
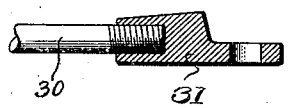
Figure 5 is an enlarged detail section showing one of the devices employed in the connection of the thrust rods complementary to the tail gate to the vehicle chassis or frame.

In order to bring about opening of the tail gate 20 as a unit incident to the movement of the body 13 to the dumping position, I provide at each side of the vehicle a thrust rod 30. The said thrust rods 30 are interposed between and pivotally connected to the chassis or frame 1 and the tail gate 20, and by reference to Figure 5, it will be understood that each rod 30 is threaded into and connected in adjustable manner at its forward end with a member 31, the said member 31 being pivotally connected at 32 to the chassis or frame. Moreover each rod 30 is connected at its rear end in appropriate manner to a member 33, the said member 33 being swingably connected at 34 to the tail gate.

It will be manifest from the foregoing that when the body 13 is loaded in the position shown in Figure 1, and the lug 17 is engaged with the latch 5 in the manner shown in Figures 1 and 3 there will be no liability of the body 13 casually tipping, nor will there be any liability of the tail gate 20 accidentally opening. When, however, the vehicle arrives at its destination and it is desired to dump the load it is simply necessary for the driver to move the latch 5 out of engagement with the lug 17 for when this is done the body 13 will gravitationally assume the dumping position shown in Figure 2. Manifestly as the body 13 swings from the position shown in Figure 1 to that shown in Figure 2, the thrust rods 30 will operate to open the tail gate 20 so as to permit the load to discharge gravitationally through the open rear end of the body 13. Incident to the restoration of the body 13 to the horizontal position, the rods 30 will operate to move the tail gate 20 to close position, and while the body 13 is in closed position the rods 30 will operate effectively in the retention of the tail gate 20 in closed state.

Notwithstanding the practical advantages ascribed to my improvement, it will be apparent that the improvement is simple and inexpensive in construction and is therefore adapted to withstand rough handling; also, that the improvement is of such character that the cost of producing the vehicle is but slightly increased.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts inasmuch as in the future practice of the invention various changes and modifications may be made such as fall within the scope of my invention as defined in my appended claim.

Having described my invention, what I claim and desire to secure by Letters-Patent, is:—

In a vehicle, the combination of a frame, standards fixed to and rising from the frame and having laterally disposed, transversely apertured portions of circular form, a dumping body, lugs fixed to and carried at the under side of said body and having lateral circular cap portions mounted on and surrounding said lateral portions of the standards, and central horizontal pintles pivotally connecting said circular standards portions and said circular cap portions, and interlocking links connecting said body and frame to limit the movement of the body in its dumping position.

In testimony whereof I affix my signature.

FRANK H. PROSSER.